(12) United States Patent
Hamlin

(10) Patent No.: US 10,933,783 B1
(45) Date of Patent: Mar. 2, 2021

(54) ATTACHMENT ASSEMBLY FOR SEATING ASSEMBLY COVER

(71) Applicant: Ford Global Technologies, LLC, Dearborn, MI (US)

(72) Inventor: Timothy Owen Hamlin, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/685,010

(22) Filed: Nov. 15, 2019

(51) Int. Cl.
*B60N 2/60* (2006.01)
*B60N 2/58* (2006.01)

(52) U.S. Cl.
CPC ......... *B60N 2/6036* (2013.01); *B60N 2/5891* (2013.01)

(58) Field of Classification Search
CPC .......................... B60N 2/6036; B60N 2/5891
USPC ..................................................... 297/218.4
See application file for complete search history.

(56) References Cited

U.S. PATENT DOCUMENTS

| | | |
|---|---|---|
| 8,099,837 B2 | 1/2012 | Santin et al. |
| 8,662,583 B2 | 3/2014 | Guadagno |
| 2007/0035165 A1 | 2/2007 | Zahel |
| 2009/0146470 A1 | 6/2009 | Thompson et al. |
| 2016/0031350 A1 | 2/2016 | Smith |
| 2017/0253157 A1 * | 9/2017 | Nagasawa ............ B60N 2/6036 |

FOREIGN PATENT DOCUMENTS

| | | | | |
|---|---|---|---|---|
| FR | 2833899 A1 * | 6/2003 | ........... | B60N 2/6036 |
| FR | 2900607 A1 * | 11/2007 | ........... | B60N 2/6036 |

OTHER PUBLICATIONS

Commonly assigned co-pending U.S. Appl. No. 16/298,025, filed Mar. 11, 2019, icluding filing receipt, application and drawings.
Commonly assigned co-pending U.S. Appl. No. 16/357,956, filed Mar. 19, 2019, including filing receipt, application and drawings.

* cited by examiner

*Primary Examiner* — Anthony D Barfield
(74) *Attorney, Agent, or Firm* — David Coppiellie; Price Heneveld LLP (57) ABSTRACT

A vehicle seating assembly is provided. The vehicle seating assembly may comprise an inner cover including an inner cover attachment part, an outer cover including an outer cover attachment part, a cushion including a trench, and an anchor assembly disposed in the trench and extending between the inner cover attachment part and an anchor member, wherein the inner cover attachment part and the outer cover attachment part are attachable to one another to form a disengageable seal at least partially disposed in the trench.

20 Claims, 9 Drawing Sheets

ATTACHMENT ASSEMBLY FOR SEATING ASSEMBLY COVER

FIELD OF THE DISCLOSURE

The present disclosure generally relates to covers for a vehicle seating assembly and, more particularly, to removable covers for a vehicle seating assembly.

BACKGROUND OF THE DISCLOSURE

Vehicle seating assemblies may include removable covers. Removable seating assembly covers may be used to change the visual appearance of the seating assembly, or to provide variations in seat trim functionality.

SUMMARY OF THE DISCLOSURE

According to one aspect of the present disclosure, a vehicle seating assembly comprises an inner cover including an inner cover attachment part, an outer cover including an outer cover attachment part, a cushion including a trench, and an anchor assembly disposed in the trench and extending between the inner cover attachment part and an anchor member, wherein the inner cover attachment part and the outer cover attachment part are attachable to one another to form a disengageable seal at least partially disposed in the trench.

Embodiments of the first aspect of the disclosure can include any one or a combination of the following features:
  the inner cover attachment part includes an inner cover strip disposed between a first inner cover portion and a second inner cover portion; Sa fastener is disposed in the inner cover strip;
  the fastener includes a seam;
  the inner cover strip includes a first inner cover strip member and a second inner cover strip member, and the seam is disposed through the first inner cover strip member and the second inner cover strip member;
  the first inner cover strip member and the second inner cover strip member form a V-shaped channel;
  the first inner cover strip member is slanted, the second inner cover strip member is slanted, and the seam is disposed at an intersection of the first and second inner cover strip members;
  the inner cover strip includes a hook tape, and the outer cover attachment part includes a loop tape;
  the outer cover attachment part includes an outer cover strip that forms a rounded protrusion;
  the inner cover strip includes loops, and the outer attachment part includes hooks;
  the first inner cover strip member and the second inner cover strip member include a first width and a second width, respectively, and the first width is substantially equal to the second width;
  the first inner cover strip member and the second inner cover strip member define a continuous member;
  the first inner cover strip member and the second inner cover strip member are separate members; and
  the anchor assembly is disposed between the seam and the anchor member.

According to a second aspect of the present disclosure, a seating assembly comprises an attachment assembly for securing an inner trim cover to an outer trim cover along a recess in a seating surface, including an inner cover attachment part integral to the inner trim cover and an outer cover attachment part integral to the outer trim cover, an anchor member disposed in or proximate to a seat, and an anchor assembly for securing the inner trim cover to the anchor member, wherein the inner cover attachment part includes a V-shaped channel that receives the outer cover attachment part to form a disengageable seal.

Embodiments of the second aspect of the disclosure can include any one or a combination of the following features:
  the outer cover attachment part includes a protrusion positionable in the V-shaped channel;
  the attachment assembly includes a hook-and-loop assembly;
  the inner cover attachment part includes hooks disposed in an occupant-facing direction, and the outer cover attachment part includes loops disposed in a seat-facing direction; and
  the inner cover attachment part includes loops disposed in an occupant-facing direction, and the outer cover attachment part includes hooks disposed in a seat-facing direction.

According to a third aspect of the present disclosure, a method for forming an attachment assembly for a detachable seating assembly cover comprises the steps of securing an inner cover strip between a first inner cover portion and a second inner cover portion, forming a seam in the inner cover strip, disposing the seam of the inner cover strip in a recess of a seating surface, anchoring the seam to an anchor member disposed in or behind the recess to form a V-shaped channel of the inner cover strip, securing an outer cover strip between a first outer cover portion and a second outer cover portion, forming the outer cover strip into a loop, and placing the loop of the outer cover strip into the V-shaped channel of the inner cover strip.

These and other aspects, objects, and features of the present disclosure will be understood and appreciated by those skilled in the art upon studying the following specification, claims, and appended drawings.

DETAILED DESCRIPTION

Figure 1:
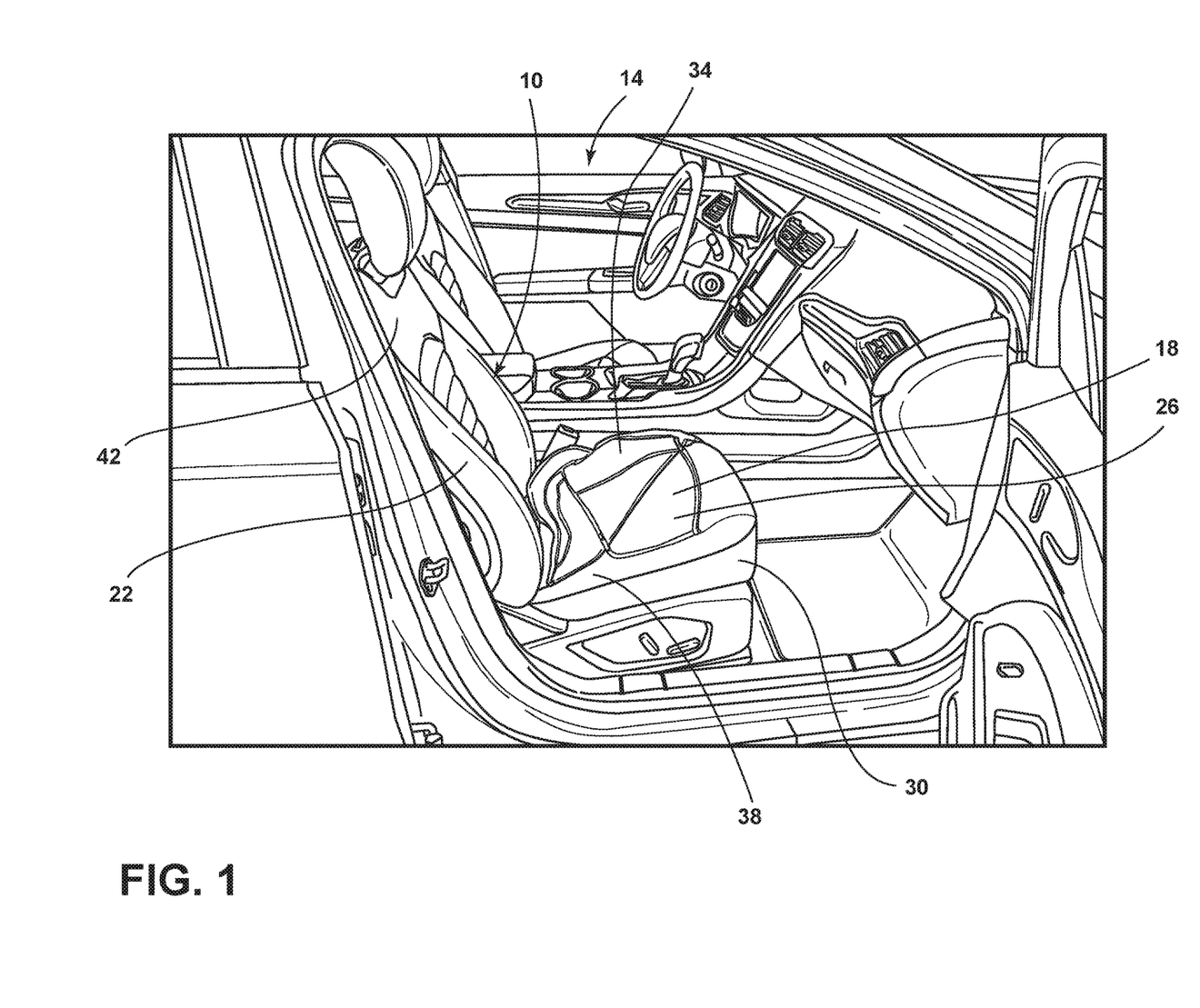
FIG. 1 is a perspective view of a seating assembly disposed in a vehicle interior with an outer cover partially detached from an inner cover.

For purposes of the description herein, the terms "upper," "lower," "right," "left," "rear," "front," "vertical," horizontal," and derivatives therefor shall relative to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a vehicle seating assembly 10 is shown disposed in a vehicle interior 14. The vehicle seating assembly 10 may include a seat 18 and a seatback 22. An inner cover 26 may be disposed over a seat cushion 30. A removable outer cover 34 may be attached to the inner cover 26. It is contemplated the inner cover 26 and the outer cover 34 may be disposed over the occupant-facing seat surface 38 and the occupant-facing seatback surface 42. It is contemplated that the inner cover 26 and the outer cover 34 may also be disposed on other surfaces of the seat 18 and the seatback 22.

Occupants may desire a change in the appearance of a vehicle interior 14. The appearance of a vehicle interior 14 may be changed by changing one or more outer covers 34 of a seating assembly 10. Occupants may want to replace dirty, ripped, or damaged outer covers 34 of the seating assembly 10 with new covers. Outer covers 34 may be sold as aftermarket items. Outer covers 34 may also be installed during the seating assembly 10 manufacturing process. During the seating assembly manufacturing process, operators may conveniently attach outer covers 34 to the seating assemblies 10. When ordering a vehicle from an Original Equipment Maker, a purchaser may select an outer cover 34 from a wide selection of available outer covers 34. The inner cover 26 disclosed herein and the outer cover 34 disclosed herein may be designed to fit over the seat 18 and/or the seatback 22. It is contemplated that the inner cover 26 and the outer cover 34 may be a unitary cover that may be disposed over the seating assembly 10.

Figure 2:
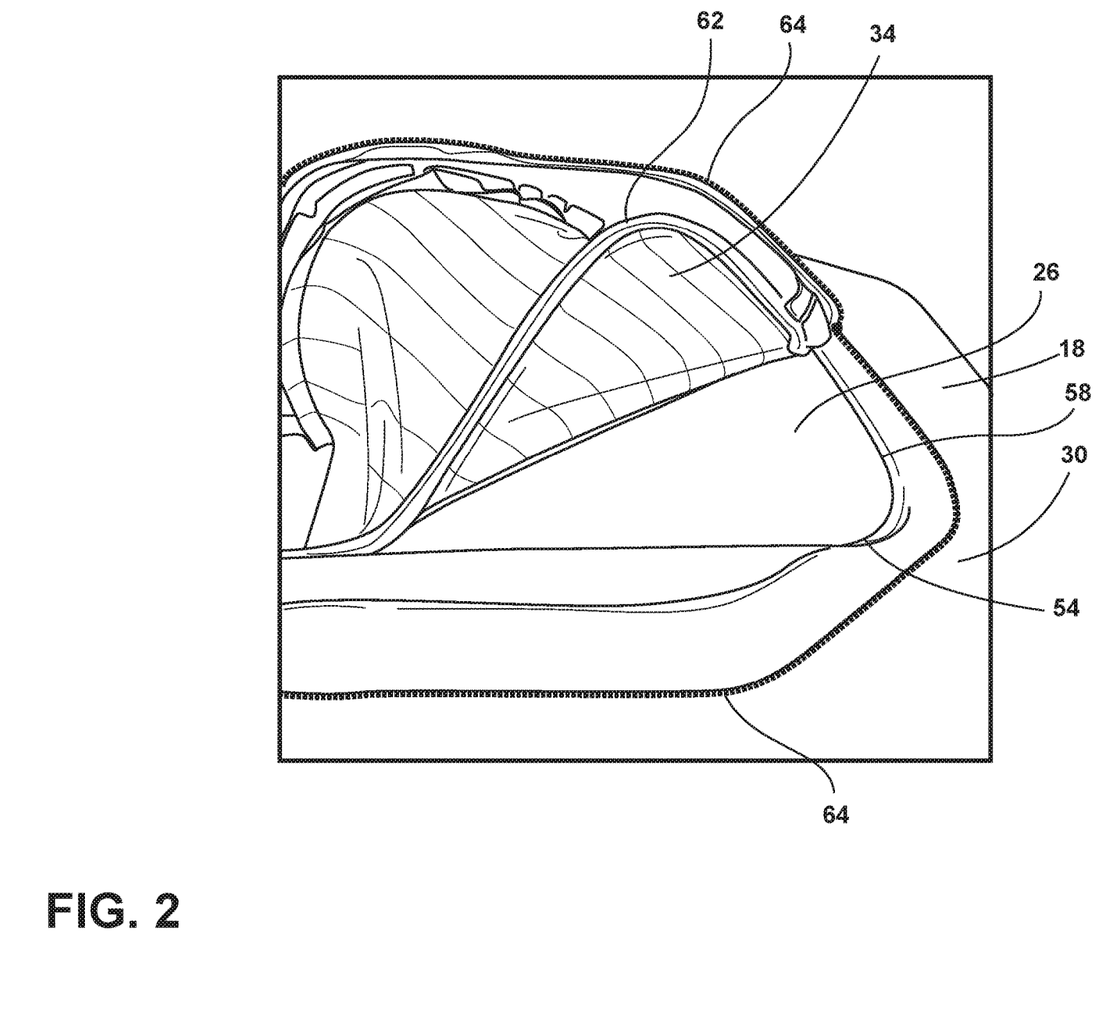
FIG. 2 is a portion of a perspective view of a seat with an outer cover partially detached from an inner cover.

With reference to FIGS. 1-2, secure attachment of an outer cover 34 to an inner cover 26 may be desired. Thus, a secure disengageable seal 50 may be disposed between an outer cover 34 and an inner cover 26. The inner cover 26 may be referred to as an inner trim cover. The outer cover 34 may be referred to as an outer trim cover. The secure disengageable seal 50 may be disposed in trenches 54 of a seat 18 or a seatback 22. A trench 54 may be disposed in a cushion 30 of the seat 18 or the seatback 22. The trench 54 may be molded into the foam that may constitute the cushion 30. As such, an attachment assembly 46 for securing an outer cover 34 to an inner cover 26 may be disposed in a contour of the seating assembly 10 defined by a trench 54.

With continued reference to FIG. 2, the seat 18 may include a zipper portion 64. The zipper portion 64 may be disposed on the inner cover 26 of the seat 18. The outer cover 34 of the seat 18 may include a zipper portion 64. The zipper portions 64 of the inner cover 26 and the outer cover 34 may be engaged to fasten the outer cover 34 to the seat 18.

With reference to FIGS. 1-13, a vehicle seating assembly 10 may include an inner cover 26 including an inner cover attachment part 58 and an outer cover 34 including an outer cover attachment part 62. An attachment assembly 46 includes the inner cover attachment part 58 and the outer cover attachment part 62. The vehicle seating assembly 10 also includes a cushion 30 including a trench 54. An anchor assembly 66 may be disposed in the trench 54 and may extend between the inner cover attachment part 58 and an anchor member. In the example shown, the anchor member may be a listing wire 70. The inner cover attachment part 58 and the outer cover attachment part 62 are attachable to one another to form a disengageable seal 50 at least partially disposed over the trench 54.

Figure 3:
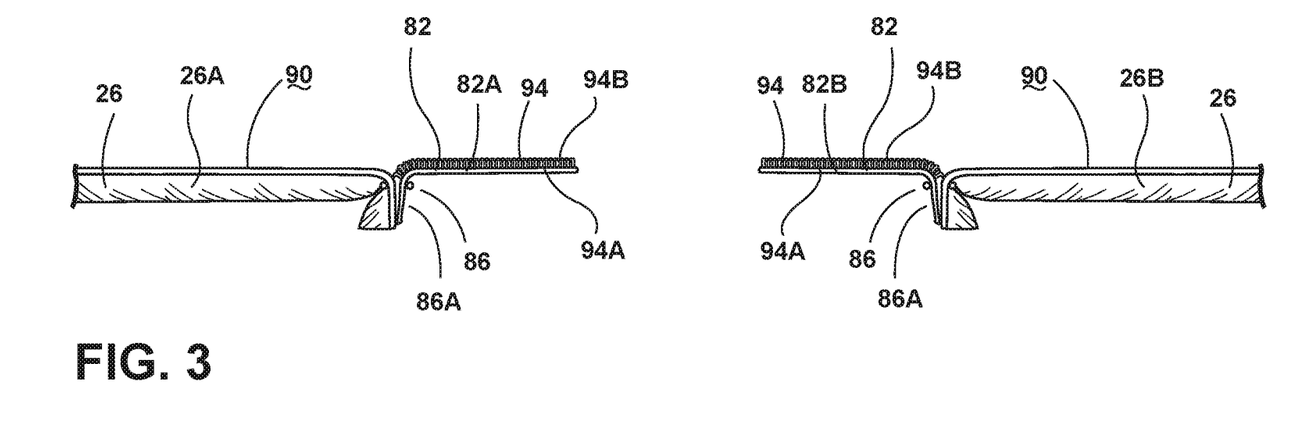
FIG. 3 is a cross-sectional view of a step in the assembly process of an inner cover having an inner cover strip that includes separate members.

Referring to FIG. 3, a step in the assembly process of an inner cover 26 having an inner cover strip 82 that includes separate inner cover strip members 82A, 82B is shown. The inner cover 26 may include inner cover portion 26A and inner cover portion 26B. The separate inner cover strip members 82A, 82B may be secured between the inner cover portion 26A and the inner cover portion 26B. Fasteners may secure the inner cover portions 26A, 26B to the respective inner cover strip members 82A, 82B. The fasteners may be join seams 86A. The inner cover 26 may include an occupant-facing seat surface 38. A hook tape 94 may be disposed on the occupant-facing seat surface 38 of the inner cover strip members 82A, 82B. In the example shown, the inner cover strip members 82A, 82B may be hook tapes 94. The hook tapes 94 may include tapes 94A and hooks 94B extending from the tapes 94A.

Figure 4:
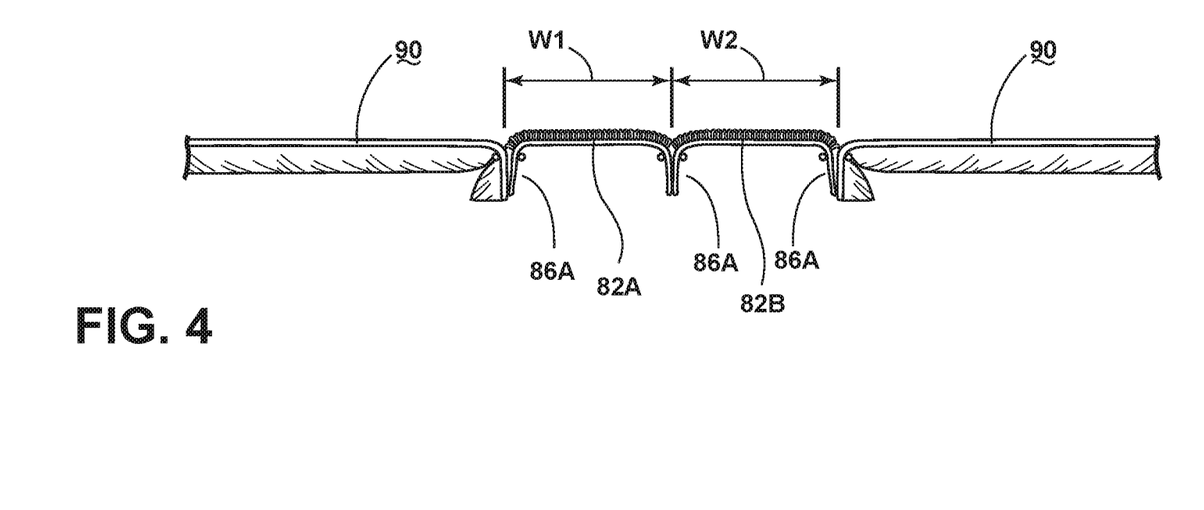
FIG. 4 is a cross-sectional view of another step in the assembly process of an inner cover having an inner cover strip that includes separate members of FIG. 3.

Referring to FIG. 4, another step in the assembly process of the inner cover 26 of FIG. 3 is shown. A fastener may join the inner cover strip member 82A to the inner cover strip member 82B. The fastener may be a join seam 86A. The inner cover strip member 82A may have a width W1, and the inner cover strip member 82B may have a width W2. In the example shown, the width W1 may be substantially equal to the width W2. As such, FIGS. 3-4 show two inner cover strip members 82A, 82B joined by the join seam 86A.

Figure 5:
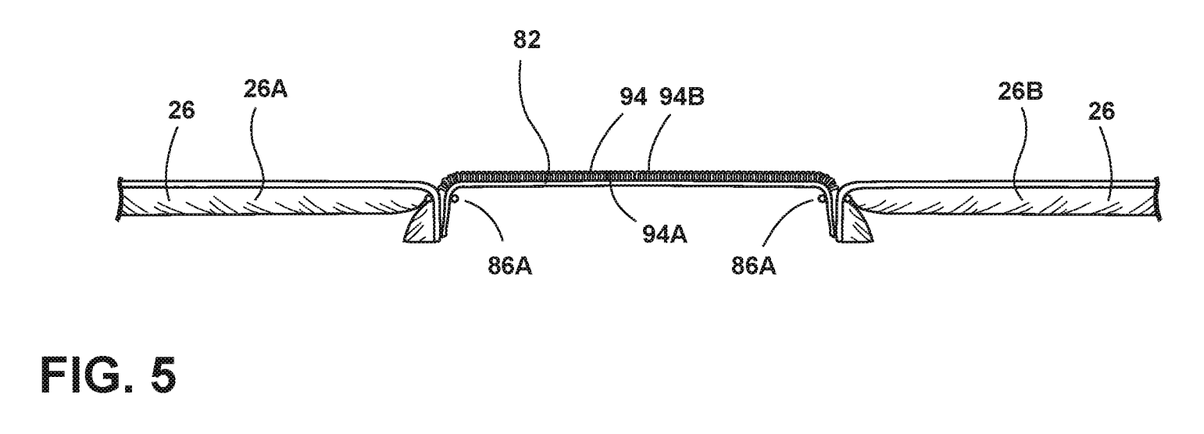
FIG. 5 is a cross-sectional view of a step in the assembly process of an inner cover having an inner cover strip that includes a continuous member.

Referring now to FIG. 5, a step in the assembly process of an inner cover 26 having an inner cover strip 82 that is a continuous member is shown. The inner cover 26 may include an inner cover portion 26A and an inner cover portion 26B. The inner cover strip 82 may be disposed between the inner cover portion 26A and the inner cover portion 26B. Fasteners may secure the inner cover portion 26A and the inner cover portion 26B to the inner cover strip 82. The fasteners may include join seams 86A. A hook tape 94 may be disposed on the A-surface 90 of the inner cover strip 82. In the example shown, the inner cover strip 82 may be a hook tape 94. The hook tape 94 may include a tape 94A and hooks 94B.

Figure 6:
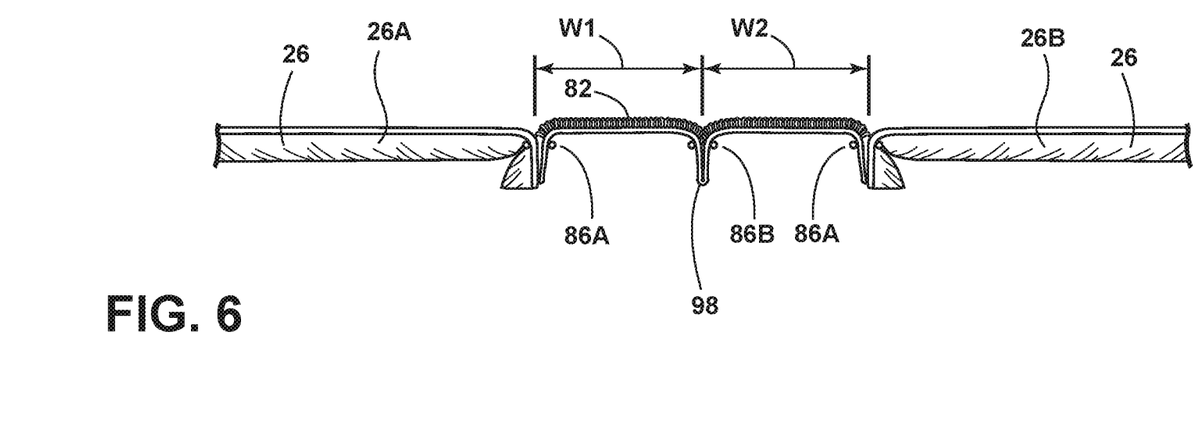
FIG. 6 is cross-sectional view of another step in the assembly process of an inner cover having an inner cover strip that includes a continuous member of FIG. 5.

Referring to FIG. 6, another step in the assembly process of an inner cover 26 having an inner cover strip 82 that forms a continuous member is shown. The fastener may gather the inner cover strip 82 in a fold 98. The fastener may be a pinch seam 86B. The inner cover strip member 82A may have a width WI, and the inner cover strip member 82B may have a width W2. In the example shown, the width W1 may be substantially equal to the width W2. As such, FIGS. 5-6 show a pinch seam 86B that may secure a fold 98 in a continuous inner cover strip 82.

Figure 7:
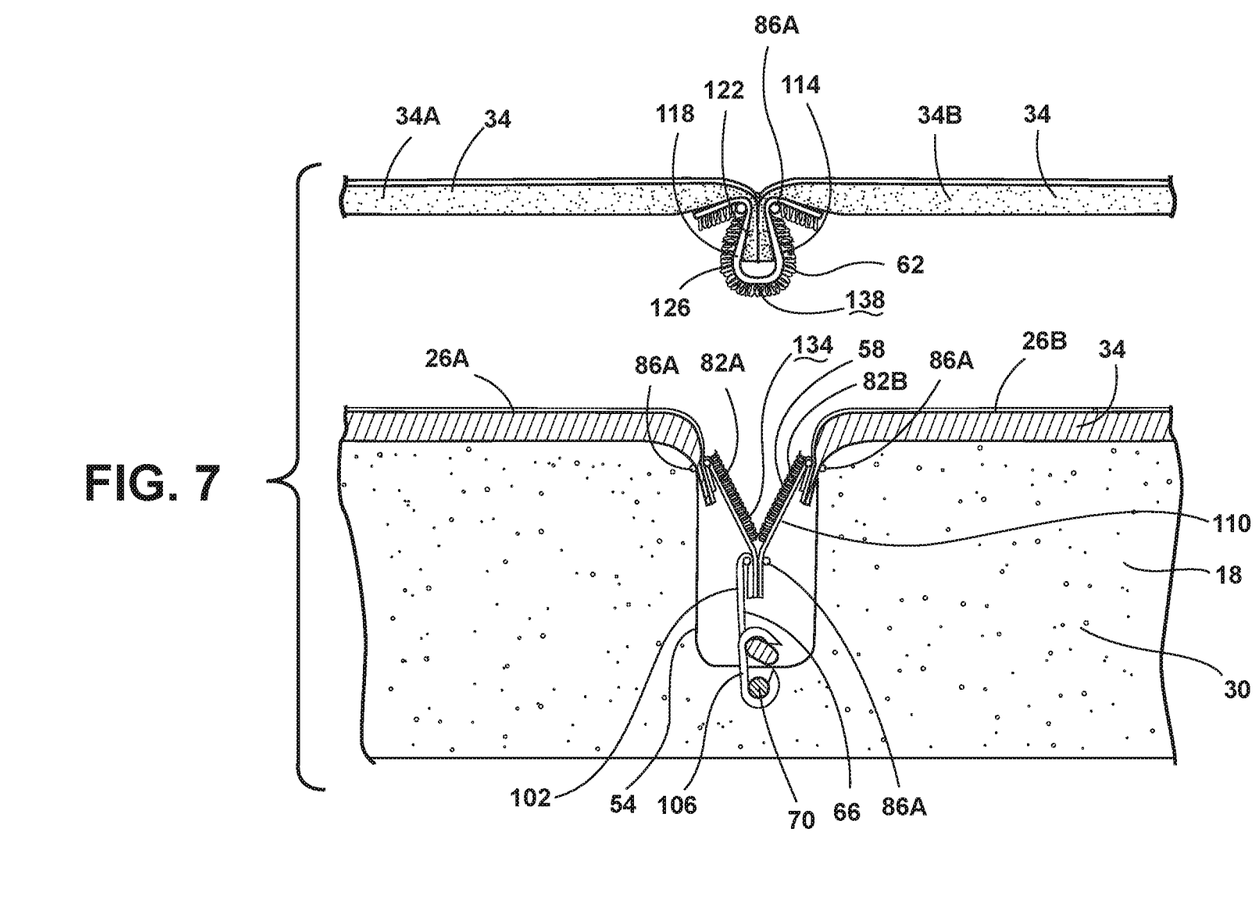
FIG. 7 is a cross-sectional view of an inner cover including an inner cover attachment part and an outer cover including an outer cover attachment part in an unattached position.

Referring to FIG. 7, a portion of a seat 18 is shown. The seat 18 may include a cushion 30 with an inner cover 26 and an outer cover 34. The cushion 30 may be disposed below the inner cover 26. As previously stated, the cushion 30 may be made of foam. A trench 54 may extend through the cushion 30. The inner cover strip member 82A and the inner cover strip member 82B may be joined by a join seam 86A. The inner cover strip member 82A and the inner cover strip member 82B may be disposed in the trench 54. An anchor member may run through the cushion 30 below the trench 54. The anchor member may be an imbedded listing wire 70. An anchor assembly may extend from the join seam 86A to the imbedded listing wire 70. The anchor assembly may include a beaded duon 102 and a hog ring 106. The inner cover strip members 82A, 82B may be attached to the respective inner cover portions 26A, 26B with join seams 86A. The inner cover strip members 82A, 82B may form a V-shaped channel 110. A join seam 86A may secure the inner cover strip members 82A, 82B together.

With reference to FIG. 7, the outer cover 34 may include an outer cover strip 114 that may be disposed proximate the joinder of an outer cover portion 34A to an outer cover portion 34B. The outer cover strip 114 may be formed into a loop shape 118 that may be attached around the seam selvage 122 of the removable outer cover portions 34A, 34B. A join seam 86A may secure the outer cover strip 114 to the outer cover portion 34A and the outer cover portion 34B. The outer cover strip 114 may include a loop tape 126 with loops 126B extending from a tape 126A.

Figure 8:
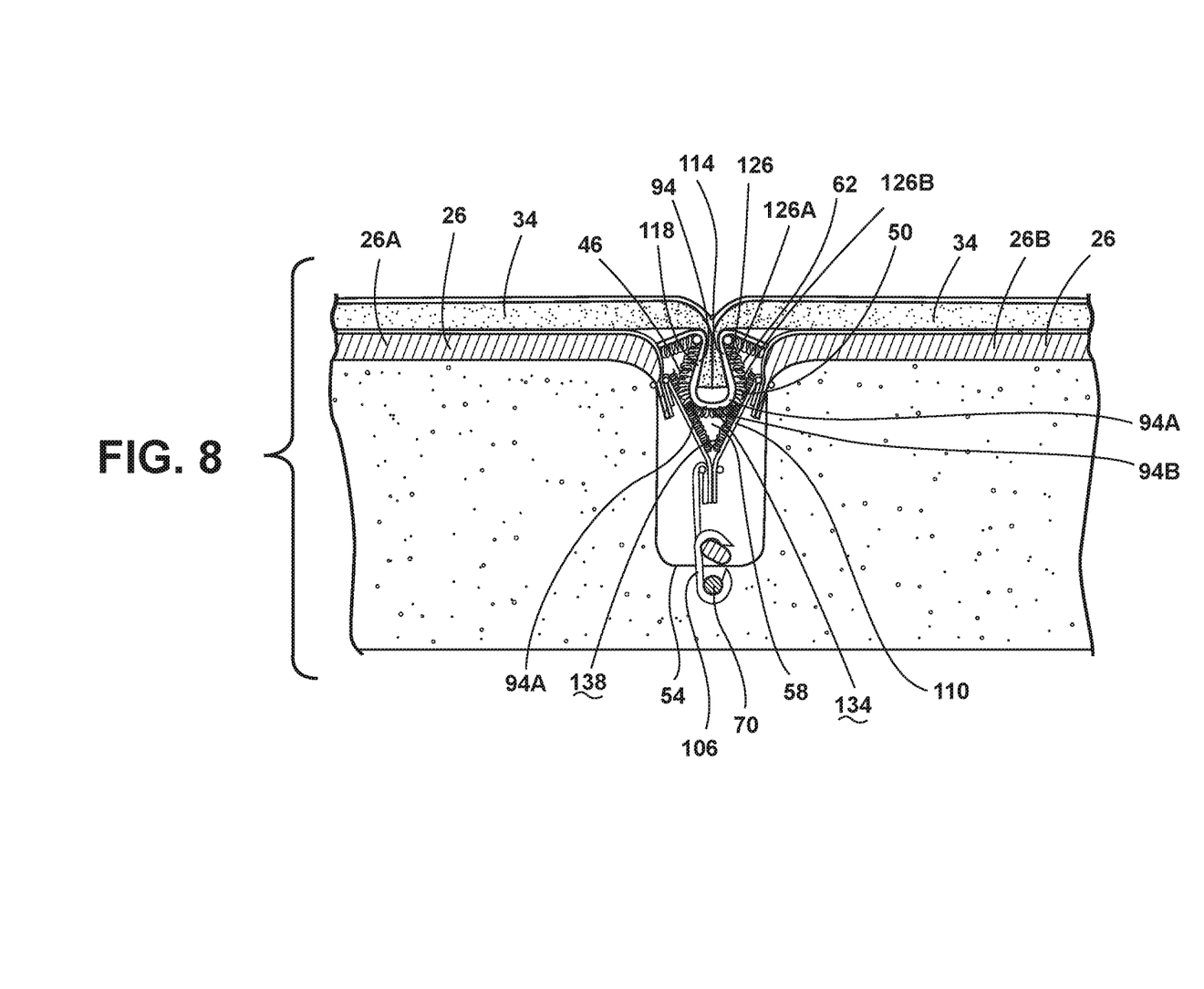
FIG. 8 is a cross-sectional view of an inner cover including an inner cover attachment part and an outer cover including an outer cover attachment part of FIG. 7 in an attached position.

With continued reference to FIGS. 7-8, the outer cover strip 114 may have loops 126B that may be disposed in the V-shaped channel 110 of the inner cover 26 having hooks 94B. The angled inner cover strip members 82A, 82B of the V-shaped channel 110 may aid in centering the loop shape 118 of the outer cover strip 114 on the removable outer cover 34. An attachment assembly 46 may be formed when an inner trim cover (for example, inner cover 26) is secured to an outer trim cover (for example, outer cover 34) along a recess (for example, trench 54) in a seating surface (for example, occupant-facing seat surface 38 or occupant-facing seatback surface 42). (FIG. 1.) The attachment assembly 46 may include an inner cover attachment part 58 integral to the inner trim cover (for example, inner cover 26). The attachment assembly 46 may include an outer cover attachment part 62 (for example, outer cover strip 114) that may be integral to the outer trim cover (for example, outer cover 34). An anchor member (for example, listing wire 70) may be disposed in or proximate the seat 18. The seating assembly 10 may also include an anchor assembly for securing the inner trim cover (for example, inner cover 26) to the anchor member (for example, listing wire 70). The inner cover attachment part 58 (for example, inner cover strip 82) may include a V-shaped channel 110 and may receive the outer cover attachment part 62 (for example, outer cover strip 114 arranged in a loop shape 118) to form a disengageable seal 50. An A-surface 134 of the inner cover attachment part 58 and a B-surface 138 of the outer cover attachment part 62 may enmesh to form the disengageable seal 50. The inner cover attachment part 58 may include hooks 94B, and the outer cover attachment part 62 may include loops 126B. As such, the inner cover attachment part 58 and the outer cover attachment part 62 may be configured as hooks 94B or hook-shaped members to hook to, or otherwise be received by, one or more of the loops 126B or loop-shaped members (e.g., a hook-and-loop assembly or Velcro®).

Referring again to FIGS. 7-8, the outer cover 34 may include zipper portions 64 disposed along its edges and configured to zip to corresponding zipper portions 64 on the seat 18 or the inner cover 26 of the seat 18. (FIG. 2.) The outer cover 34 may be secured to the inner cover 26 with an attachment assembly 46 positioned in trenches 54 of the seat 18 or the seatback 22. Alternatively, the inner cover 26 may be secured to the outer cover 34 with an attachment assembly 46 positioned in trenches 54 of the seat 18 or the seatback 22 and zipper portions 64 disposed along the edges of the inner cover 26 and the outer cover 34. As such, the outer cover 34 may be a removable cover.

Figure 9:
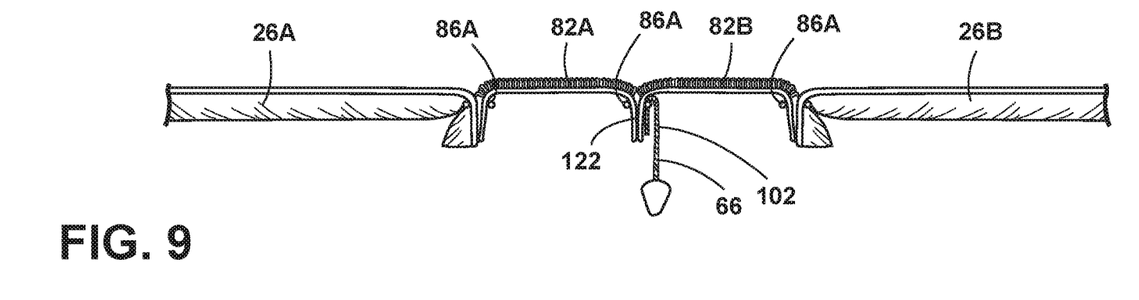
FIG. 9 is a cross-sectional view of an inner cover having an inner cover strip that includes two separate members and a beaded duon.
Figure 10:
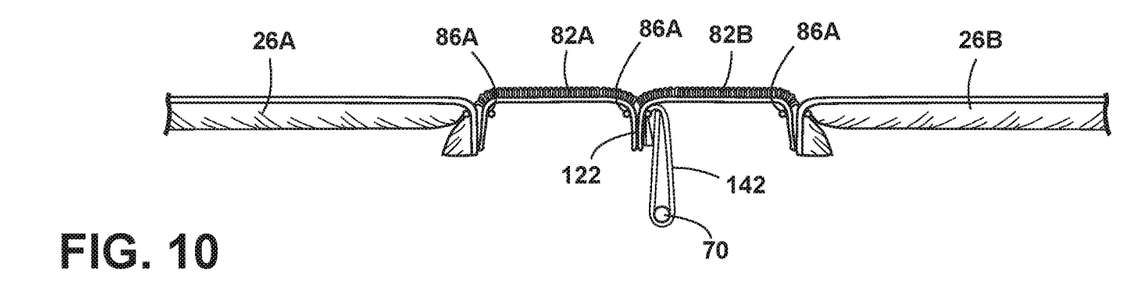
FIG. 10 is a cross-sectional view of an inner cover having an inner cover strip that includes two separate members, a listing pocket, and a listing wire.
Figure 11:
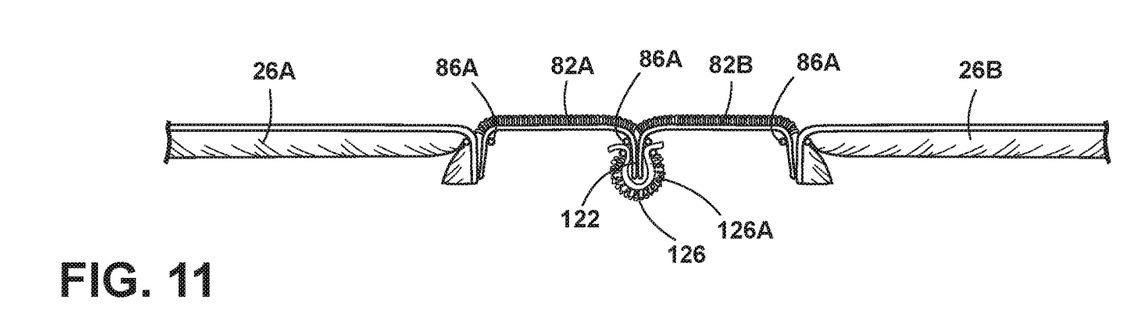
FIG. 11 is a cross-sectional view of an inner cover having an inner cover strip that includes two separate members and a loop tape.

Referring now to FIGS. 9-11, examples of anchor assemblies for attaching the join seam 86A or the pinch seam 86B of an inner cover strip 82 to a cushion 30 are shown. The anchor assemblies may be attached to the cushion 30 in such a manner that the inner cover strip 82 forms a V-shaped channel 110 when the inner cover strip 82 is attached to an anchor member disposed in the cushion 30. FIG. 9 shows an anchor assembly including a beaded duon 102. The beaded duon 102 may be attached to the seam selvage 122 at the join seam 86A. The beaded duon 102 may be compatible with imbedded foam clips, imbedded wires (for example, listing wire 70 in FIGS. 7-8), and hog rings (for example, hog ring 106 in FIGS. 7-8). The imbedded foam clips and imbedded wires (for example, listing wire 70 in FIGS. 7-8) may be imbedded in the cushion 30.

Referring to FIG. 10, an anchor assembly may include a listing pocket 142 and a listing wire 70. The listing pocket 142 may be attached to the seam selvage 122 at the join seam 86A. The listing pocket 142 and listing wire 70 may be compatible with imbedded wires (for example, listing wire 70 in FIGS. 7-8) and hog rings 106. The imbedded wires (for example, listing wire 70 in FIGS. 7-8) may be imbedded in the cushion 30.

Referring to FIG. 11, an anchor assembly may include a loop tape 126. The loop tape 126 may be attached to the seam selvage 122 at the join seam 86A. The loop tape 126 may be compatible with hook tape imbedded in foam. The foam may be part of the seat cushion 30. As such, the anchor assemblies shown in FIGS. 9-11 may be used to attach an inner cover strip 82 including separate inner cover strip members 82A, 82B to the anchor member. (FIGS. 4, 7-11.) The anchor assemblies shown in FIGS. 9-11 may also be used to attach an inner cover strip 82 that is a continuous member to the anchor member. (FIG. 6.)

Figure 12:
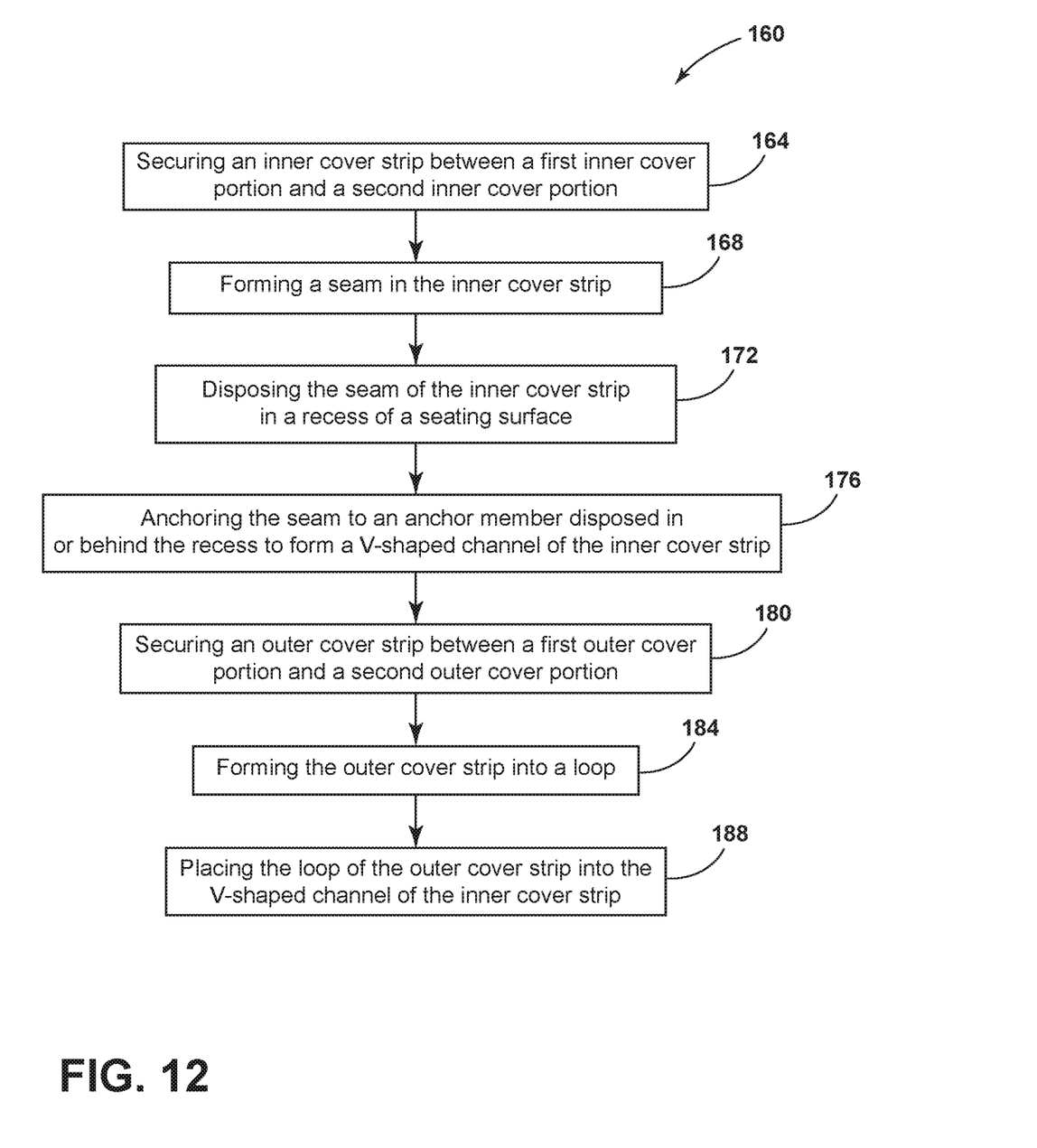
FIG. 12 is a flow diagram of a method for forming an attachment assembly for a detachable seating assembly cover.

Referring now to FIG. 12, a flow chart showing the steps 160 of a method for forming an attachment assembly 46 for a detachable seating assembly cover (for example, outer cover 34) is shown. Step 164 includes securing an inner cover strip 82 between a first inner cover strip member 82A and a second inner cover strip member 82B. Step 168 includes forming a seam (join seam 86A or pinch seam 86B) in the inner cover strip 82. Step 172 includes disposing the seam (join seam 86A or pinch seam 86B) of the inner cover strip 82 in a recess (trench 54) of a seating surface. Step 176 includes anchoring the seam (join seam 86A or pinch seam 86B) to an anchor member disposed in or behind the recess (trench 54) to form a V-shaped channel 110 of the inner cover strip 82. Step 180 includes securing an outer cover strip 114 between a first outer cover portion 34A and a second outer cover portion 34B. Step 184 includes forming the outer cover strip 114 into a loop shape 118. Step 188 includes placing the loop shape 118 of the outer cover strip 114 into the V-shaped channel 110 of the inner cover strip 82.

Figure 13:
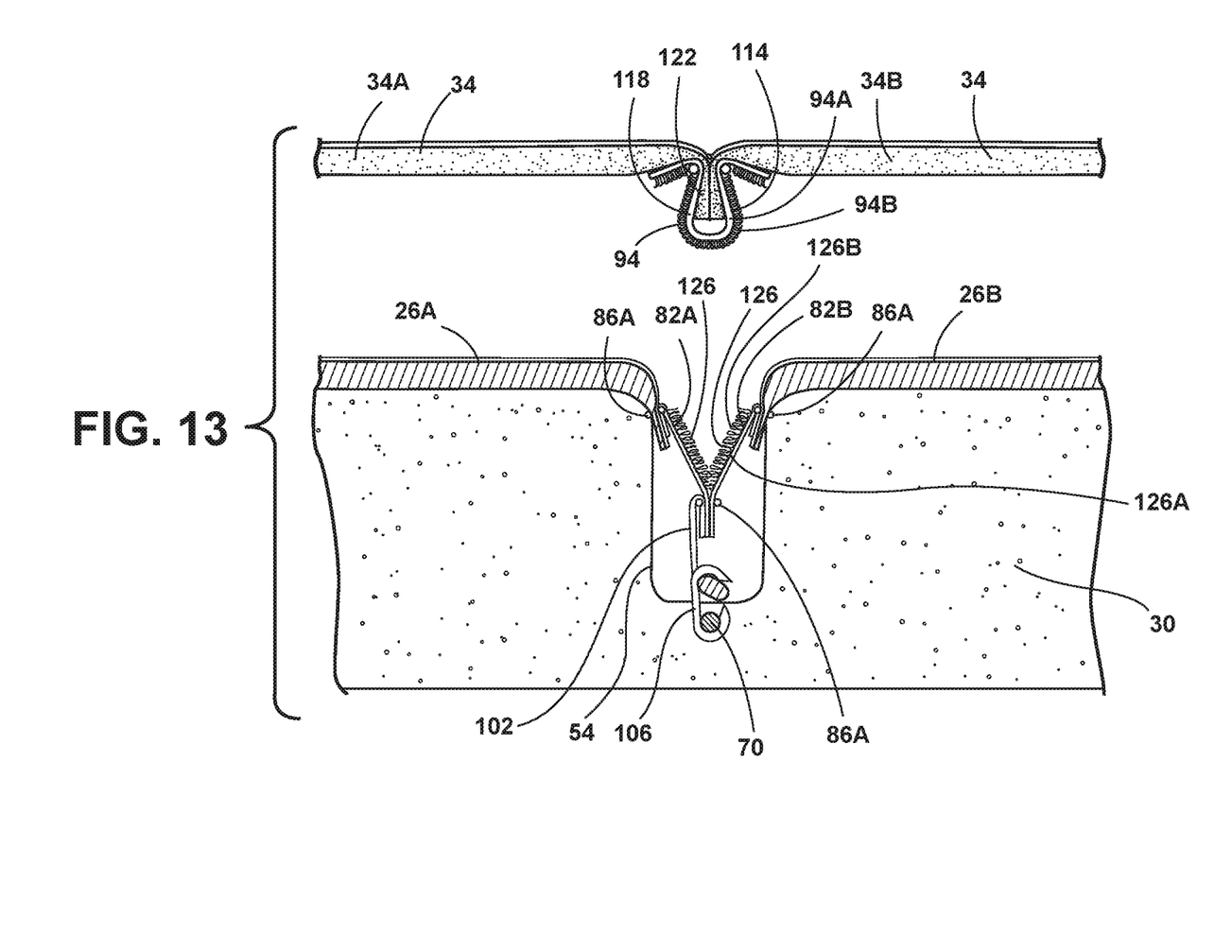
FIG. 13 is a cross-sectional view of another example of an inner cover including an inner cover attachment part and an outer cover including an outer cover attachment part in an unattached position.

Referring to FIG. 13, in another example, the loops 126B may be disposed on the inner cover strip members 82A, 82B. The hooks 94B may be disposed on the outer cover strip 114. The loops 126B and the hooks 94B may form a disengageable seal 50. The disengageable seal may include a hook-and-loop assembly (e.g., Velcro®). As such, the loops 126B and the hooks 94B may be disposed on various parts of the attachment assembly 46.

A variety of advantages may be achieved by the present disclosure. The attachment assembly 46 may be positioned in a trench 54 below the occupant-facing seat surface 38 or the occupant-facing seatback surface 42. The attachment assembly 46 together with the anchor assembly may attach the inner cover 26 to the foam. The depth of the hook tape 94 (on the inner cover 26) in the trench 54 allows the corresponding outer cover strip 114 to be drawn down into the trench 54 to form a V-shaped channel 110. The V-shaped channel 110 may be drawn into the trench 54 when the V-shaped channel 110 is stretched to attach the anchor assembly to the anchor member. The drawn down V-shaped channel 110 may allow the attachment assembly 46 to be positioned below the occupant-facing seat surface 38 or the occupant-facing seatback surface 42 to create the appearance of a traditional cut and sewn trim cover. The V-shaped channel 110 may improve comfort by moving the multiple layers of seams (for example, join seam 86A or pinch seams 86B on the inner cover strip 82 and the outer cover strip 114) away from the occupant. The V-shaped channel 110 geometry may help a user center the outer cover attachment part 62 on the outer trim cover within the trench 54. The construction of the V-shaped channel 110 may allow the inner cover 26 to be securely attached to the foam pad with attachment methods including imbedded foam clips, hog rings, hook and loop fasteners, and other attachment methods.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly, comprising:
an inner cover including an inner cover attachment part;
an outer cover including an outer cover attachment part;
a cushion including a trench; and
an anchor assembly disposed in the trench and extending between the inner cover attachment part and an anchor member, wherein the inner cover attachment part and the outer cover attachment part are attachable to one another to form a disengageable seal at least partially disposed in the trench, wherein the inner cover attachment part incudes an inner cover strip disposed between a first inner cover portion and a second inner cover portion, wherein a fastener including a seam is disposed in the inner cover strip, and wherein the inner cover strip includes a first inner cover strip member and a second inner cover strip member, and wherein the seam is disposed through the first inner cover strip member and the second inner cover strip member.

2. The vehicle seating assembly of claim 1, wherein the first inner cover strip member and the second inner cover strip member form a V-shaped channel.

3. The vehicle seating assembly of claim 2, wherein the first inner cover strip member is slanted, wherein the second inner cover strip member is slanted, and wherein the seam is disposed at an intersection of the first and second inner cover strip members.

4. The vehicle seating assembly of claim 3, wherein the inner cover strip includes a hook tape, and wherein the outer cover attachment part includes a loop tape.

5. The vehicle seating assembly of claim 4, wherein the outer cover attachment part includes an outer cover strip that forms a rounded protrusion.

6. The vehicle seating assembly of claim 3, wherein the inner cover strip includes loops, and wherein the outer attachment part includes hooks.

7. The vehicle seating assembly of claim 1, wherein the first inner cover strip member and the second inner cover strip member include a first width and a second width, respectively, and wherein the first width is substantially equal to the second width.

8. The vehicle seating assembly of claim 7, wherein the first inner cover strip member and the second inner cover strip member define a continuous member.

9. The vehicle seating assembly of claim 7, wherein the first inner cover strip member and the second inner cover strip member are separate members.

10. The vehicle seating assembly of claim 7, wherein the anchor assembly is disposed between the seam and the anchor member.

11. A seating assembly, comprising:
an attachment assembly for securing an inner trim cover to an outer trim cover along a recess in a seating surface and including:
an inner cover attachment part integral to the inner trim cover, wherein the inner cover attachment part includes two inner cover strip members secured together by a seam; and
an outer cover attachment part integral to the outer trim cover;
an anchor member disposed in or proximate to a seat; and
an anchor assembly for securing the inner trim cover to the anchor member, wherein the inner cover attachment part includes a V-shaped channel defined by the two inner cover strip members secured together by the seam that receives the outer cover attachment part to form a disengageable seal.

12. The seating assembly of claim 11, wherein the outer cover attachment part includes a protrusion positionable in the V-shaped channel defined by the two inner cover strip members secured together by the seam.

13. The seating assembly of claim 12, wherein the attachment assembly includes a hook-and-loop assembly.

14. The seating assembly of claim 13, wherein the inner cover attachment part includes hooks disposed in an occupant-facing direction, and wherein the outer cover attachment part includes loops disposed in a seat-facing direction.

15. The seating assembly of claim 13, wherein the inner cover attachment part includes loops disposed in an occupant-facing direction, and wherein the outer cover attachment part includes hooks disposed in a seat-facing direction.

16. A method for forming an attachment assembly for a detachable seating assembly cover, comprising the steps of:

securing an inner cover strip between a first inner cover portion having a first inner cover strip member and a second inner cover portion having a second inner cover strip member;

forming a seam between the first inner cover strip member and the second inner cover strip member;

disposing the seam in a recess of a seating surface;

anchoring the seam to an anchor member disposed in or behind the recess to form a V-shaped channel of the inner cover strip, wherein the V-shaped channel is defined by the first inner cover strip member and the second inner cover strip member;

securing an outer cover strip between a first outer cover portion and a second outer cover portion;

forming the outer cover strip into a loop; and placing the loop of the outer cover strip into the V-shaped channel defined by the first inner cover strip member and the second inner cover strip member of the inner cover strip.

17. The seating assembly of claim 11, wherein the anchor assembly includes a beaded duon.

18. The seating assembly of claim 11, wherein the anchor assembly includes a listing pocket and a listing wire.

19. The seating assembly of claim 11, wherein the anchor assembly includes a loop tape.

20. The seating assembly of claim 11, wherein the outer cover attachment part includes an outer cover strip formed into a loop shape.

* * * * *